(12) United States Patent
Klaassen et al.

(10) Patent No.: US 10,457,247 B2
(45) Date of Patent: Oct. 29, 2019

(54) SEAT BELT BUCKLE PRESENTER

(71) Applicant: TRW Automotive GmbH, Alfdorf (DE)

(72) Inventors: Jens Klaassen, Alfdorf (DE); David Reich, Schorndorf (DE); Karsten Kortschack, Lorch (DE); Karl Birk, Ebersbach (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 103 days.

(21) Appl. No.: 15/518,848

(22) PCT Filed: Sep. 29, 2015

(86) PCT No.: PCT/EP2015/002080
§ 371 (c)(1),
(2) Date: Apr. 13, 2017

(87) PCT Pub. No.: WO2016/058708
PCT Pub. Date: Apr. 21, 2016

(65) Prior Publication Data
US 2017/0225646 A1  Aug. 10, 2017

(30) Foreign Application Priority Data
Oct. 17, 2014 (DE) .................. 10 2014 015 344

(51) Int. Cl.
*B60R 22/20* (2006.01)
*B60R 22/03* (2006.01)
*B60R 22/18* (2006.01)

(52) U.S. Cl.
CPC .............. *B60R 22/20* (2013.01); *B60R 22/03* (2013.01); *B60R 2022/1806* (2013.01)

(58) Field of Classification Search
CPC .. B60R 22/20; B60R 22/03; B60R 2022/1806
See application file for complete search history.

(56) References Cited

U.S. PATENT DOCUMENTS

| 4,650,215 A | * | 3/1987 | Sasaki | ..................... B60R 22/03 280/809 |
| 5,123,673 A | * | 6/1992 | Tame | ..................... B60R 22/03 100/268 |

(Continued)

FOREIGN PATENT DOCUMENTS

JP    2011245895    12/2011

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

A belt buckle feeder comprises a stationary base (12) adapted to be fixedly mounted to the vehicle and a carriage (14) movable to a retracted position and to an extended position vis-à-vis the base (12), which carriage is connected to a belt buckle (20) via an intermediate plate (22) provided between the belt buckle (20) and the carriage (14). The intermediate plate (22) is tightly connected to the belt buckle (20) and there is provided a positive guidance by which the intermediate plate (22) is pivoted during traversing to the extended position by a predetermined degree vis-à-vis the carriage (14) so that in addition to the traversing movement of the carriage (14) along a tilting direction (N) the belt buckle (20) reversibly tilts from a home position to an inclined position.

17 Claims, 7 Drawing Sheets

(56) References Cited

U.S. PATENT DOCUMENTS

| | | | | |
|---|---|---|---|---|
| 5,236,220 A * | 8/1993 | Mills | ................ | B60R 22/22 280/801.1 |
| 5,346,256 A * | 9/1994 | Wiesler | ................ | B60R 22/03 280/802 |
| 5,431,446 A * | 7/1995 | Czarnecki | ................ | B60R 22/03 280/802 |
| 6,969,088 B2 * | 11/2005 | Wang | ................ | B60R 22/03 280/802 |
| 7,407,193 B2 * | 8/2008 | Yamaguchi | ................ | B60R 22/03 280/801.1 |
| 7,866,703 B2 * | 1/2011 | Spahn | ................ | B60R 22/195 280/806 |
| 8,157,292 B2 * | 4/2012 | You | ................ | B60N 2/688 280/801.1 |
| 9,718,436 B2 * | 8/2017 | Hayashi | ................ | B60R 22/20 |
| 10,081,330 B2 * | 9/2018 | Arnold | ................ | B60R 22/06 |
| 2002/0043872 A1 * | 4/2002 | Townsend | ................ | B60R 22/03 297/473 |
| 2005/0224270 A1 * | 10/2005 | Holbein | ................ | B60R 22/03 180/268 |
| 2006/0231317 A1 * | 10/2006 | Yamaguchi | ................ | B60R 22/03 180/268 |
| 2009/0094807 A1 * | 4/2009 | Sugimoto | ................ | B60R 22/03 24/589.1 |
| 2011/0057432 A1 | 3/2011 | You et al. | | |
| 2017/0253214 A1 * | 9/2017 | Klaassen | ................ | B60R 22/03 |

\* cited by examiner

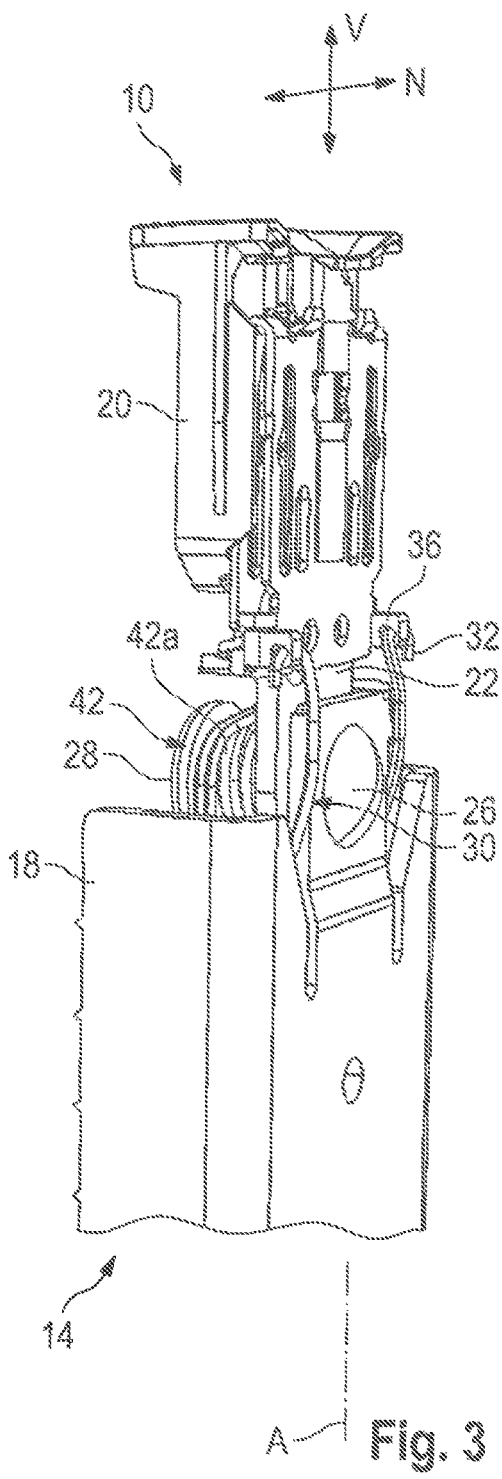
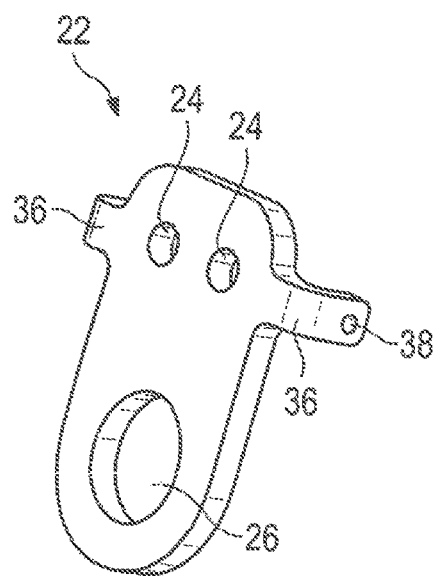
Fig. 3
Fig. 4

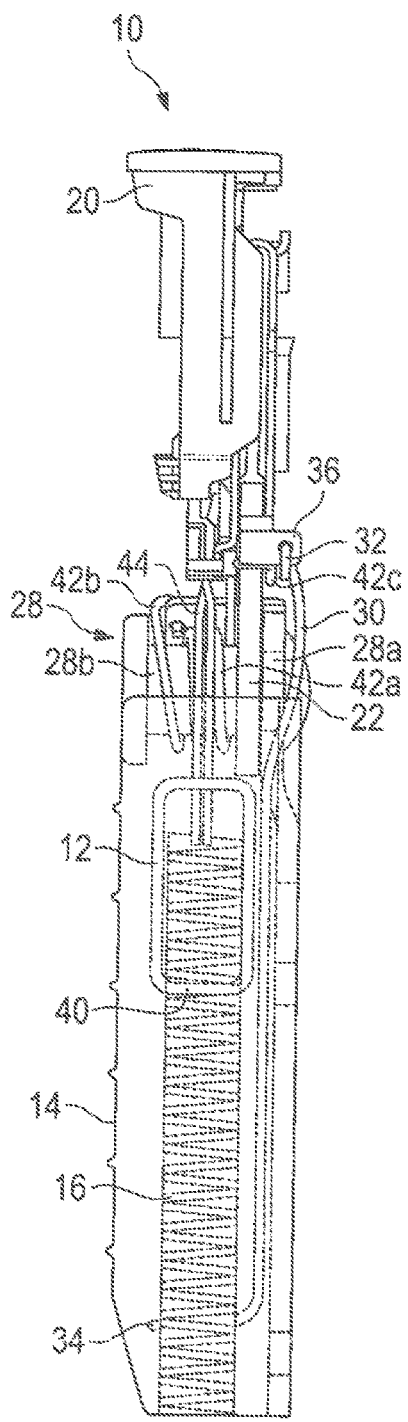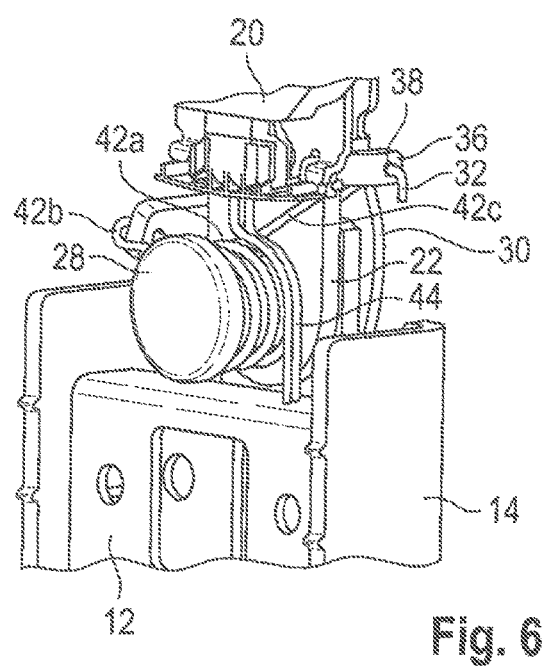
Fig. 5
Fig. 6

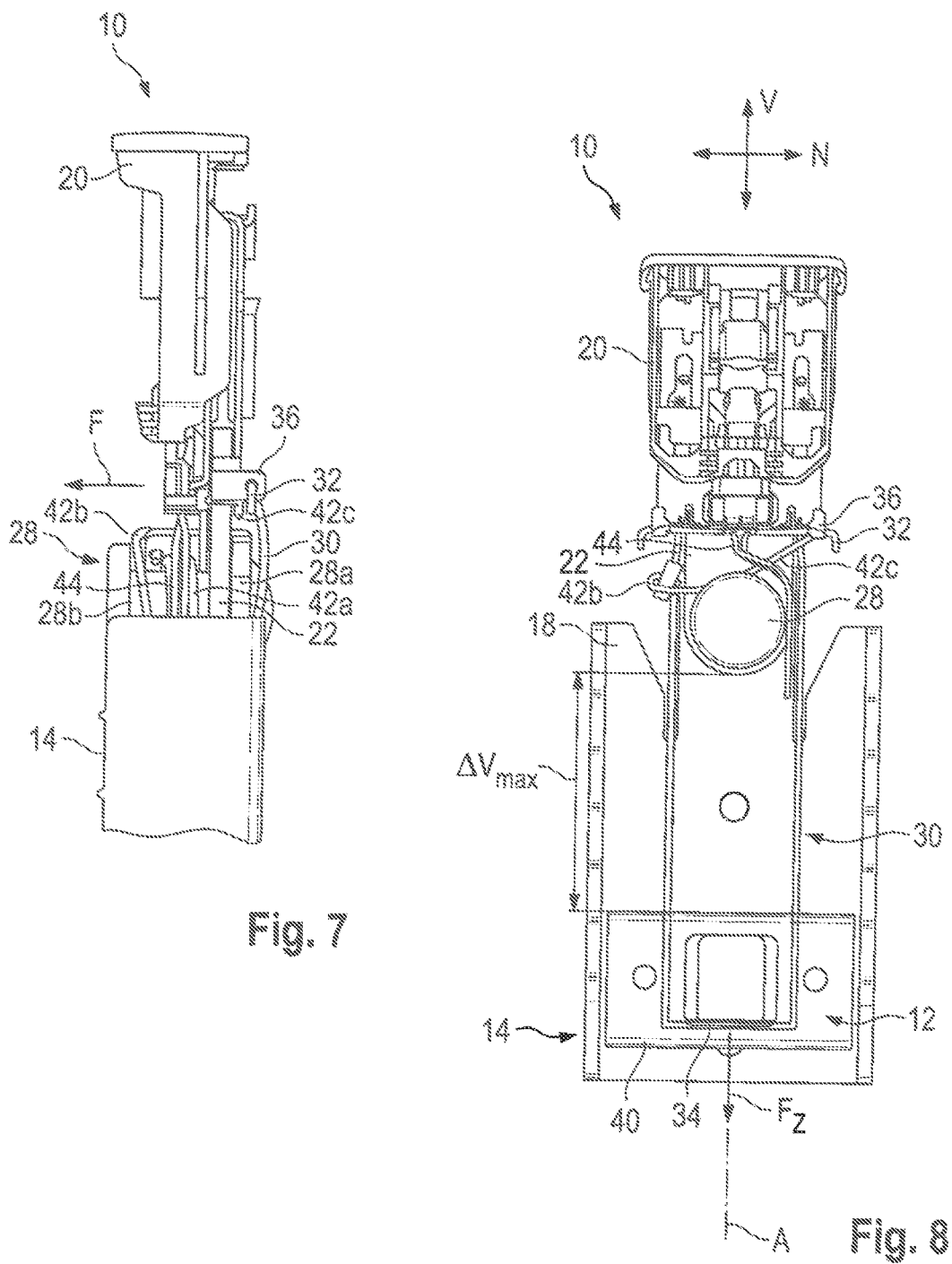

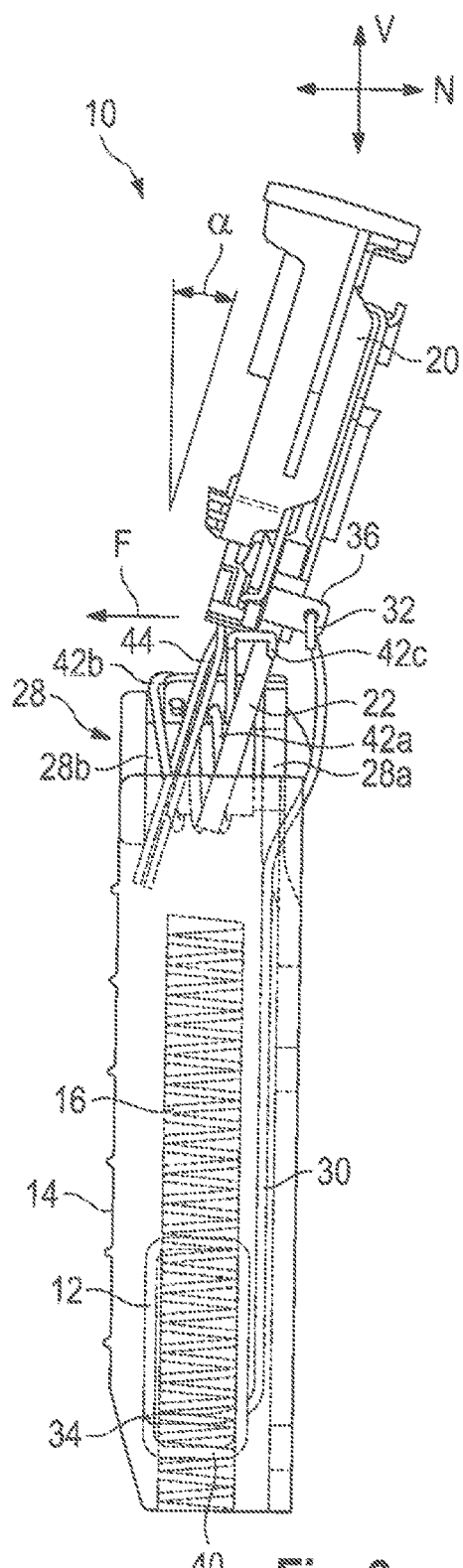
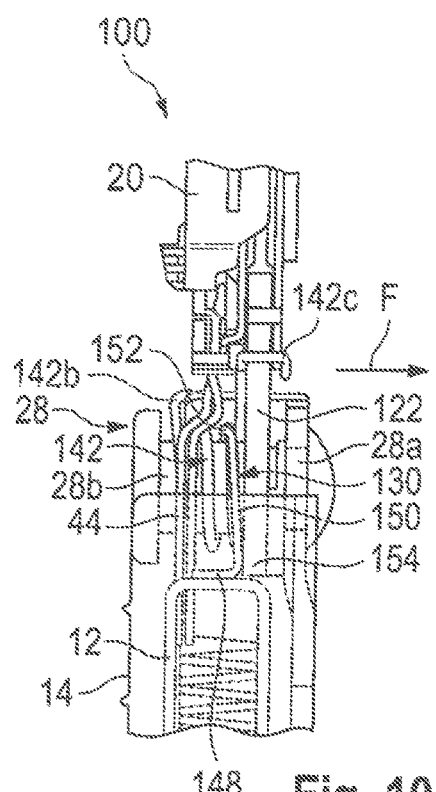
Fig. 9
Fig. 10

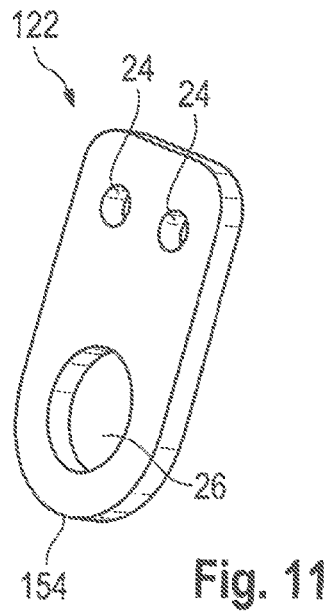
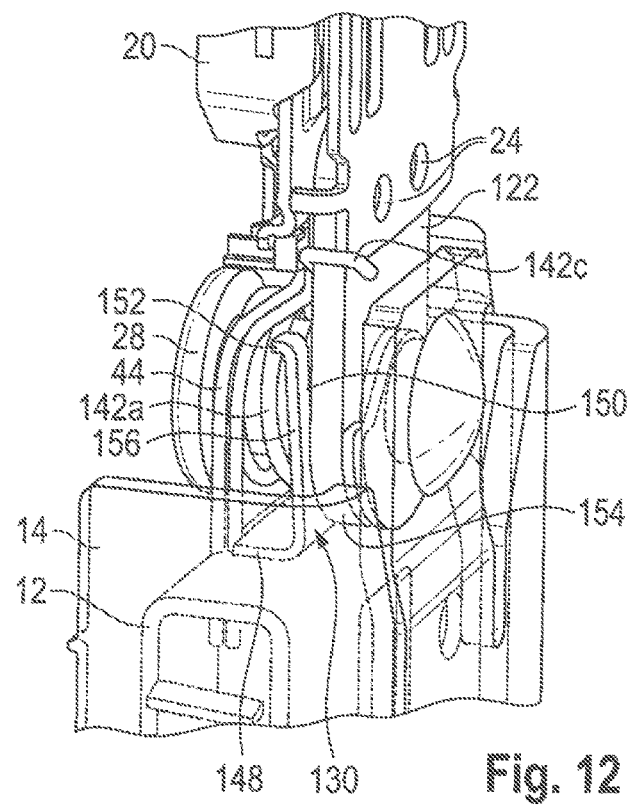
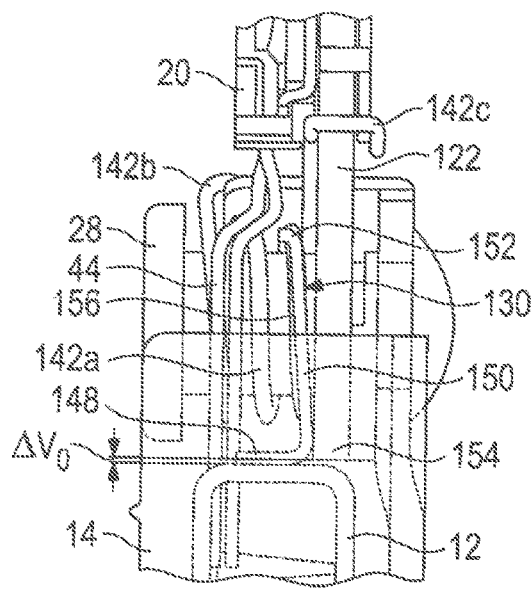
Fig. 11
Fig. 12
Fig. 13

SEAT BELT BUCKLE PRESENTER

RELATED APPLICATIONS

This application corresponds to PCT/EP2015/002080, filed Sep. 29, 2015, which claims the benefit of German Application No. 10 2014 015 344.4, filed Oct. 17, 2014, the subject matter of which are incorporated herein by reference in their entirety.

BACKGROUND OF THE INVENTION

The invention relates to a belt buckle feeder.

Belt buckle feeders facilitate fastening end unfastening of a seat belt in that the belt buckle is reversibly moved, by means of a drive, from a retracted position in which it is no obstacle to the vehicle occupant during normal driving operation to an extended position in which the vehicle occupant may easily reach the belt buckle.

It is felt to be especially comfortable when the belt buckle in the extended position moves toward the vehicle occupant so as to facilitate insertion of the plug-in tongue.

SUMMARY OF THE INVENTION

It is the object of the invention to provide a compact cost-efficient belt buckle feeder which is comfortable for the occupant.

This is achieved with a belt buckle feeder comprising a stationary base which is adapted to be fixedly mounted on the vehicle and a carriage movable to a retracted position and to an extended position vis-à-vis the base, with the carriage being connected to a belt buckle by an intermediate plate provided between the belt buckle and the carriage. The intermediate plate is tightly connected to the belt buckle and there is provided a positive guidance by which the intermediate plate is pivoted vis-à-vis the carriage about a predetermined degree during traversing to the extended position so that, in addition to the traversing movement of the carriage along a tilting direction, the belt buckle reversibly tilts from a home position into an inclined position.

The use of a positively guided intermediate plate rigidly connected to the belt buckle helps to integrate the mechanism for inclining the belt buckle at least largely into the carriage and/or the base of the belt buckle feeder, where it is protected from environmental influences.

The intermediate plate can be arranged, for example, on a fixing bolt tightly connected to the carriage which reaches through an opening in the intermediate plate. In this way, a simple and cost-efficient as well as robust pivoting option is created. The fixing bolt may be a stepped rivet comprising a shoulder the diameter of which is larger than the diameter of the opening in the intermediate plate. In this manner the tilting of the intermediate plate can be limited. The shoulder may also serve as a lower counter-bearing point, when the tension element exerts a force on the intermediate plate.

Preferably, a spring element is provided for exerting a force along the tilting direction on the intermediate plate. Accordingly, the belt buckle can be loaded into the inclined position by the spring action. Alternatively, the spring may act as a resetting element and exert a force on the belt buckle into the home position.

Advantageously, the spring element is fixed on the carriage so as to ensure sufficient force acting on the intermediate plate.

The maximum angle of inclination about which the belt buckle is tilted from the home position to the inclined position ranges from 5 to 15°, especially from 7 to 12°, for example.

The tilting direction is preferably selected to be parallel to the fixing bolt.

In the home position the belt buckle may be upright so that its longitudinal axis is congruent with the longitudinal axis of the carriage or it may be inclined already vis-à-vis the longitudinal axis of the carriage.

It is of advantage in this embodiment when the spring element loads the intermediate plate into the home position, i.e. serves as a resetting element, when the belt buckle is moved to the retracted position again and the tensile force acting on the intermediate plate subsides. In this way, the belt buckle is retained in the home position even in the retracted position of the carriage. An inclination of the belt buckle takes place only at the end of the traversing movement in the vicinity of the extended position. According to a second preferred embodiment, the positive guidance comprises a rigid link plate tightly arranged on the base which is configured so that the intermediate plate moves to its inclined position during the traversing movement to the extended position of the carriage. For this purpose, the spring element includes a pressure section acting on the intermediate plate and loading the latter into the inclined position.

The intermediate plate preferably abuts on the link plate with its tower carriage-side end. During the traversing movement to the extended position, the force exerted on the intermediate plate by the link plate subsides so that the intermediate plate including the belt buckle pivots to the Inclined position by the effect of force of the spring element. When the carriage is returned to the retracted position, a resetting force is exerted via the link plate on the intermediate plate which compensates the spring force and sets the intermediate plate into its home position again.

In order to realize this movement the link plate is inclined away from the intermediate plate e.g. toward the belt buckle and a carriage-side end of the intermediate plate slides along the link plate in the direction of movement.

The inclination of the link plate along the traversing direction may be constant so that during the traversing movement the belt buckle inclines uniformly toward the vehicle occupant. The link plate could also be stepped or formed to have different inclinations, however, so as to cause a discontinuous inclination movement of the belt buckle.

The use of a uniformly inclined link plate easily enables the inclination movement of the belt buckle to start already upon the beginning of the traversing movement. It is also possible, however, to cause an inclination movement only at the end of the traversing movement to the extended position by an appropriate shape of the link plate.

The link plate may include two parallel arms encompassing the fixing bolt in the retracted position of the carriage so that a symmetric load of the intermediate plate during the traversing movement and thus uniform inclination of the belt buckle is obtained.

The link plate preferably is a formed sheet metal part which can be easily manufactured at low cost.

In a first preferred embodiment, the positive guidance includes a tension element acting on the intermediate plate.

The tension element may be formed so that at the end portion of the traversing movement of the carriage into the extended position it contacts an engageable element on the base and is retained by the latter, wherein an increasing tensile force acting on the tension element is produced. The engageable element is arranged rigidly, tightly and non-displaceably on the base, for example in the form of a projection which the tension element will contact from a particular position in the traversing path. In such design, the belt buckle does not start to incline out of its home position before the end portion of the traversing movement is reached and the tension element is loaded. On the other hand, during the traversing movement taking place before it remains in its home position. The end portion may begin, for example, about 5 to 15 mm before the maximum extended position is reached.

The tension element is preferably flexible and in particular is a wire or a rope. The tension element substantially should not be elastic, however, for exactly transmitting a tensile force. When the tension element is designed as a wire loop, for example, also non-straight extensions of the tension element can be easily realized without a complex three-dimensional component having to be manufactured.

Advantageously, the tension element acts on the intermediate plate along the tilting direction offset against a center of gravity of the intermediate plate so that a tensile force acting on the tension element generates a torque onto the intermediate plate.

For this, on the intermediate plate two securing tabs arranged on opposite longitudinal sides and projecting along the tilting direction may be disposed, with the tension element acting on the securing tabs. If the tension element is a wire loop, for example, the free ends of the wire are connected to the securing tabs. For this purpose, openings or recesses through which the tension element extends may be provided.

The securing tabs are preferably arranged on the belt buckle side of the opening in the intermediate plate so as to achieve an as large lever stroke as possible.

BRIEF DESCRIPTION OF THE DRAWINGS

Hereinafter the invention shall be illustrated in detail by way of two embodiments with reference to the attached drawings, wherein:

FIG. 3 shows the belt buckle feeder from FIG. 1 in a perspective schematic rear view;

FIG. 4 shows a schematic perspective view of an intermediate plate of the belt buckle feeder from FIG. 1;

FIG. 5 shows a schematic side view of the belt buckle feeder from FIG. 1;

FIG. 6 shows a schematic perspective detailed view of the belt buckle feeder from FIG. 1;

FIG. 7 shows details of the belt buckle feeder from FIG. 1 in a schematic side view;

FIG. 8 shows the belt buckle feeder from FIG. 1 in the completely extended position in a front view;

FIG. 9 shows the belt buckle feeder from FIG. 8 in a schematic side view;

FIG. 10 shows a schematic detailed view of a belt buckle feeder according to the invention in accordance with a second embodiment;

FIG. 11 shows an intermediate plate of the belt buckle feeder from FIG. 10 in a schematic perspective view;

FIG. 12 shows details of the belt buckle feeder from FIG. 10 in a schematic perspective view; and FIGS. 13 to 16 show schematic views of the belt buckle feeder from FIG. 10 during the movement from the completely retracted position to the completely extended position.

DESCRIPTION

Figure 1:
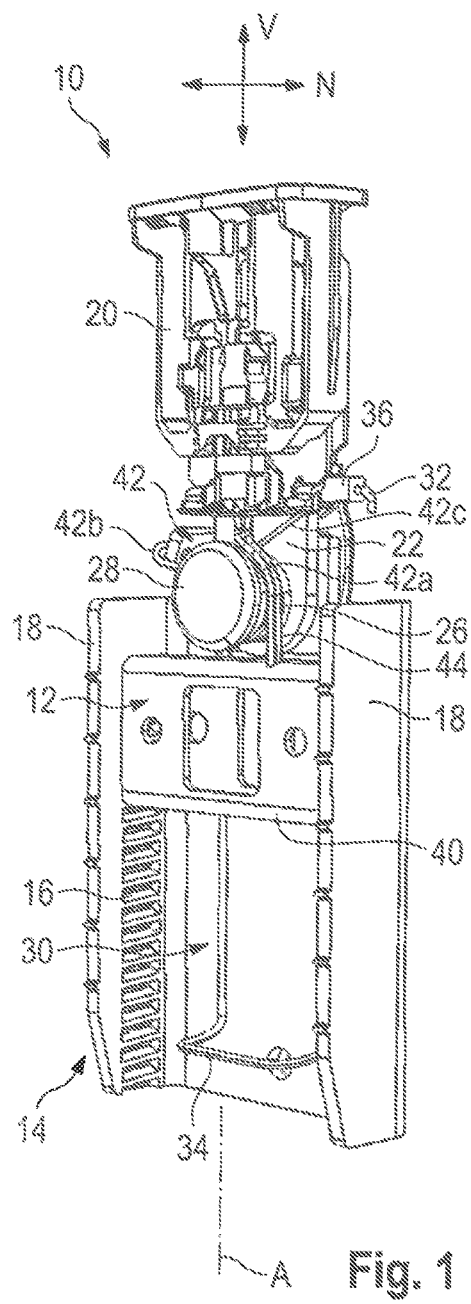
FIG. 1 shows a schematic perspective representation of a belt buckle feeder according to the invention in accordance with a first embodiment.

FIG. 1 illustrates a belt buckle feeder 10 comprising a base 12 (indicated only) and a carriage 14 supported on the base 12 to be movable along an axial direction A in a traversing direction V of the belt buckle feeder 10. The base 12 is tightly fixed to the vehicle.

The carriage 14 encompassing the base 12 in portions and being U-shaped or box-shaped in cross-section has a gear rack structure 16 which is formed at parallel narrow sides 18 of the carriage 14.

On the carriage 14 a belt buckle 20 is secured via a rigid intermediate plate 22 which is rigidly connected to the belt buckle 20 by means of two securing openings 24 (cf. FIGS. 3 and 4).

Figure 2:
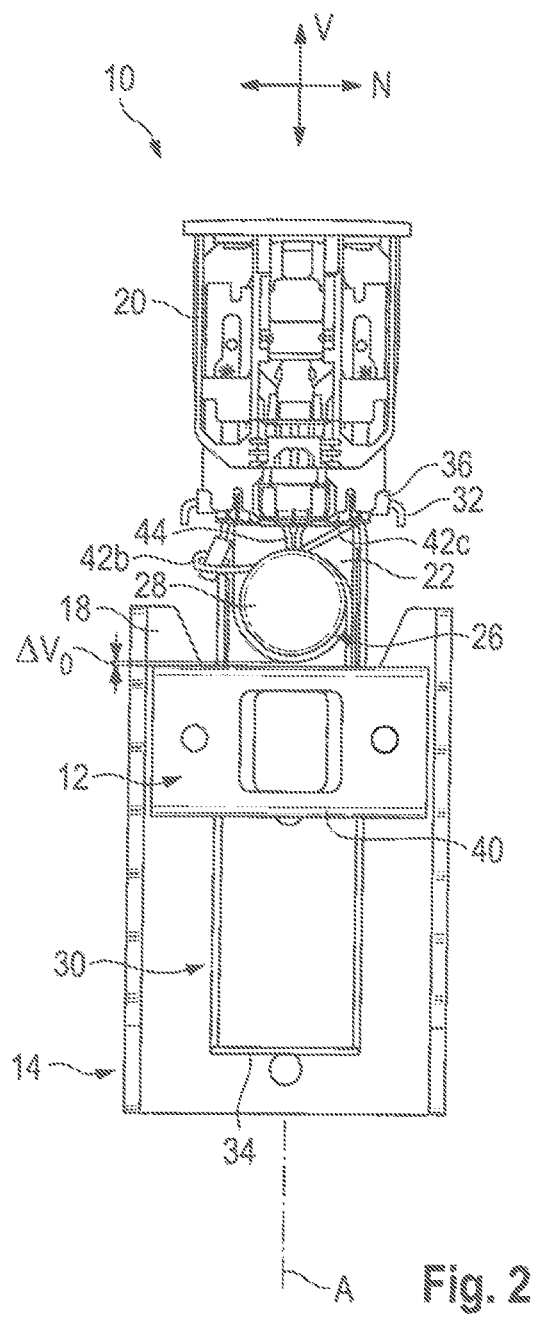
FIG. 2 shows the belt buckle feeder from FIG. 1 in a front view.

The carriage 14 and thus the belt buckle 20 can be moved, via a linear drive (not shown) on the base 12, by means of the gear rack structure 16 from a completely retracted position shown in FIGS. 1 and 2 to a completely extended position shown in FIGS. 8 and 9.

The intermediate plate 22 (cf. FIG. 4) includes an opening 26 through which a fixing bolt 28 being connected to the carriage 14 fixed in position is reaching. The fixing bolt 28 in this case is in the form of a stepped bolt (cf. e.g. FIG. 5) comprising a first section 28a having a smaller diameter than the opening 26 in the intermediate plate 22 and a second section 28b having a larger diameter than the opening 26.

The section 28a extends along the fixing bolt 28 over more than the width of the intermediate plate 22, for example over twice to three times the width thereof, so that the intermediate plate 22 may tilt along the section 28a vis-à-vis the fixing bolt 28.

This allows for inclining the belt buckle 20 vis-à-vis the carriage 14 in a tilting direction N about a predetermined angle so that the belt buckle 20 may adopt a home position and an inclined position.

In the home position which the belt buckle 20 adopts in the retracted position of the belt buckle feeder 10, the belt buckle 20 is upright in these examples (see e.g. FIGS. 1 and 2). The inclined position, on the other hand, is adopted by the belt buckle 20 in the completely extended position of the belt buckle feeder 10 (see e.g. FIGS. 8 and 9). The maximum angle of inclination α ranges from 5° to 15° and especially from 7° to 12°, for example.

The movement of the carriage 14 between the retracted position and the extended position is carried out reversibly and serves for rendering the fastening and unfastening of a seat belt more comfortable for the vehicle occupant. The comfort is increased in that the belt buckle 20 in the extended position is simultaneously pivoted to the inclined position so that it is conveniently accessible for the vehicle occupant. For a normal driving operation, the carriage 14 is moved to the retracted position with the belt buckle 20 adopting its home position, the upright position in this case, again.

The pivoting movement is carried out without any separate drive, rather the pivoting movement is derived by a mechanism from the vertical traversing movement.

In the first embodiment shown in FIGS. 1 to 9, a tension element 30 is provided for positively guiding the intermediate plate 22 so as to move the belt buckle 20 from the home position along the tilting direction N to the inclined position.

The tension element 30 in this case is realized in the form of a wire strap which is secured by its free ends 32 to the intermediate plate 22 and in a loop 34 protrudes into the carriage 14 (cf. FIG. 1).

At the intermediate plate 22 two securing tabs 36 located on the two opposite longitudinal sides of the intermediate plate 22 and projecting from the intermediate plate 22 along the tilting direction N are formed, wherein each of the securing tabs 36 includes a securing opening 38 through which an end 32 of the tension element 30 is pulled. The securing openings 38 are distanced from a body of the intermediate plate 22 so far that the tension element 30 acts outside the center of gravity of the intermediate plate 22 and a tensile force $F_Z$ acting on the securing tabs 38 results in tilting of the intermediate plate 22 on the fixing bolt 28.

The securing tabs 36 are provided on the belt-buckle side end of the intermediate plate 22 approximately level with the securing openings 24, whereas the opening 28 is formed on the carriage-side end of the intermediate plate 22 so that adequate leverage for tilting the intermediate plate 22 is generated.

The base 12 includes an engageable element 40 (not shown in detail), for example in the form of a projection or a hook, which is contacted by the tension element in an end portion of the traversing movement to the extended position so that it is retained on the same. In this way, during further traversing in the direction of the extended position a tensile force which is transmitted via the securing tabs 36 to the intermediate plate 22 and thus to the belt buckle 20 secured thereto is exerted on the tension element 30. As a consequence, the belt buckle 20 tilts along the tilting direction N up to its tilted position.

In the shown embodiment, the tension element 30 freely extends over the majority of the traversing movement within the carriage 14 without contacting the engageable element 40. Merely for the last section of the traversing movement, approximately the last 5 to 15 mm, the tension element 30 abuts on the engageable element 40 and is retained by the latter so that the belt buckle 20 tilts.

During return to the retracted position the tension element 30 becomes disengaged from the engageable element 40 again.

FIG. 2 illustrates the belt buckle feeder 10 in its completely retracted position in which no movement of the carriage 14 along the shifting direction V has taken place so far ($\Box V_0$).

FIGS. 8 and 9, on the other hand, illustrate the belt buckle feeder 10 in the maximally extended position in which the maximum shift distance $\Box V_{max}$ has been covered.

A spring element 42 provides a resetting force which loads the belt buckle 20 into the home position. The spring element 42 in this case is bent from a wire and is wound by plural spiral windings in a section 42a about the section 28a of the fixing bolt 28. A first free end 42b of the spring element 42 is tightly connected to the carriage 14, while a second free end 42c in the area of the securing tabs 36 acts on the intermediate plate 22. In this way, the end 42c of the spring element 42 pulls the bolt buckle 20 in the direction of the section 28b of the fixing bolt 28 into the home position thereof and thus produces a counter-force to the tensile force applied via the tension element 30. The force applied by the spring element 42 is chosen to be smaller than the force to be applied by the tension element 30 so that the belt buckle 20 may tilt along the tilting direction. When the tensile force is omitted, the spring element 42 produces a resetting force F, however, which pulls the intermediate plate 22 and thus the belt buckle 20 back to the home position.

Moreover, the belt buckle feeder 10 includes electric connecting cables 44 (cf. FIG. 1) extending toward the belt buckle 20 and being connected, for example, to a sensor for detecting the plug-in of a plug-in tongue.

FIGS. 10 to 16 illustrate a belt buckle feeder 100 in accordance with a second embodiment.

Components known from the first embodiment already and being present in an identical or only slightly modified form will maintain their previously inserted reference numerals.

The positive guidance by which the intermediate plate 122 is tilted in this case is not constituted by a tension element but by a rigid link plate 130 tightly connected to the base 12 (cf. FIG. 13). The intermediate plate 122 therefore goes without the securing tabs of the first embodiment (cf. FIG. 11).

As in the first embodiment, the belt buckle 20 is connected tightly and rigidly, via the securing openings 24 in the intermediate plate 122, to the intermediate plate 122, whereas the latter may tilt along a fixing bolt 28 which extends through the opening 26 in the intermediate plate 122. The opening 26 and the fixing bolt 28 can be configured as in the first embodiment.

The link plate 130 is a formed sheet metal part and includes a securing section 148 by which it is tightly connected to the base 12, for example by a welded connection. Starting from the securing section 148 a guiding section 150 for guiding the intermediate plate 122 extends to a free end 152 facing away from the base 12. A lower carriage-side end 154 of the intermediate plate 122 constantly abuts on the guiding section 150.

The guiding section 150 is tilted against the direction of the tilting movement in the inclined position so that the free end 152 is spaced from the intermediate plate 122 when the latter is upright and is oriented in parallel to the axial direction A. In this example, the guiding section 150 is configured to have a uniform tilt.

The guiding section 150 is divided into two parallel arms 158 forming a U-shaped cutout and in the completely retracted position encompassing the fixing bolt 28, as this is evident from FIG. 12, for example. During the traversing movement, the lower end 154 of the intermediate plate 122 always abuts on both arms 156 to the same extent.

When the carriage 14 moves along the traversing direction V in the direction of the extended position, the lower end 154 of the intermediate plate 122 slides along the link plate 130, wherein an increasing range of motion is formed for the intermediate plate 122 along the section 28a of the fixing bolt 28.

A spring element 142 which, just as the spring element 42 of the first embodiment, in a section 142a has plural spiral-shaped windings surrounding the section 28b of the fixing bolt 23 in this case includes a free end 142c acting as a compression spring which acts on the intermediate plate 122 in the tilting direction N and exerts a force in the inclined position. As in the first embodiment, the free end 142c of the spring element 142 encompasses the intermediate plate 122 level with the securing openings 24.

The other free end 142b of the spring element 142 is tightly anchored to the carriage 14 just as in the first embodiment.

Figure 14:
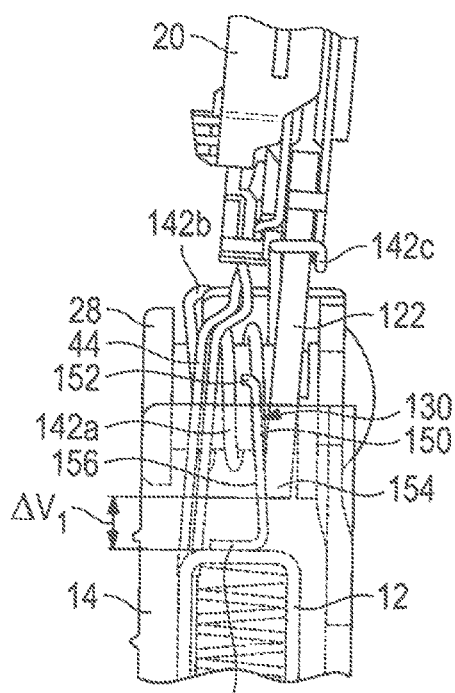
Figure 15:
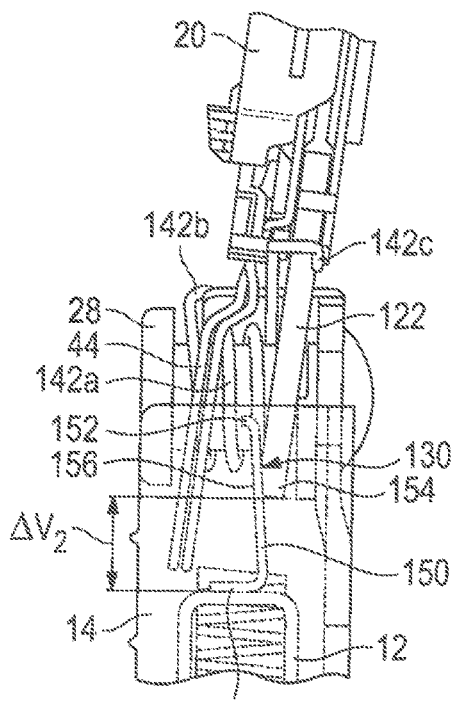
Figure 16:
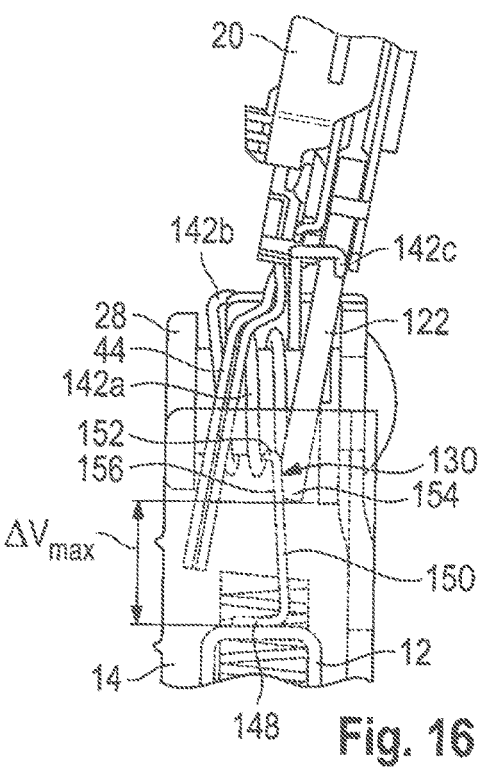

The FIGS. 13 to 16 illustrate the movement of the intermediate plate 122 and of the belt buckle 20 during the traversing movement from the completely retracted position without any relative displacement between the carriage 14 and the bass 12 ($V_0$) via two intermediate steps ($V_1$, $V_2$)

shown in FIGS. 14 and 15 up to the maximally extended position ($V_{max}$) in which the belt buckle 20 is tilted about the maximum shift angle α.

Due to the uniform inclination of the guiding section 150 of the link plate 130, the tilting movement of the belt buckle 20 is carried out uniformly over the entire shift distance. If the guiding section 150 were configured to have different inclinations in its contour, also a tilting movement of the belt buckle 20 adapted by means of the shift distance could be achieved.

The invention claimed is:

1. A belt buckle feeder comprising a stationary base (12) adapted to be fixedly mounted on the vehicle and a carriage (14) movable in a linear traversing direction (V) to a retracted position and to an extended position vis-à-vis the base (12), which carriage is connected to a belt buckle (20) via an intermediate plate (22; 122) provided between the belt buckle (20) and the carriage (14), wherein the intermediate plate (22; 122) is tightly connected to the belt buckle (20), and wherein as the carriage (14) moves in the linear traversing direction (V) to the extended position, the intermediate plate (22; 122) is moved in the linear traversing direction (V) by the carriage (14) and pivoted a predetermined degree with respect to the carriage (14) in a tilting direction (N) by a positive guidance so that in addition to the traversing movement of the carriage (14), the belt buckle (20) reversibly tilts along the tilting direction (N) from a home position to an inclined position, and wherein a spring element (42; 142) is provided which exerts a force (F) along the tilting direction (N) on the intermediate plate (22; 122).

2. The belt buckle feeder according to claim 1, wherein the intermediate plate (22; 122) is arranged on a fixing bolt (28) being tightly connected to the carriage (14) which fixing bolt reaches through an opening (26) in the intermediate plate (22; 122).

3. The belt buckle feeder according to claim 2, wherein the fixing bolt (28) is configured as a stepped rivet comprising a shoulder the diameter of which is larger than the diameter of the opening (26) in the intermediate plate (22).

4. The belt buckle feeder according to claim 1, wherein the spring element (42) loads the intermediate plate (22) into the home position.

5. The belt buckle feeder according to claim 1, wherein the spring element (142) includes a pressure section (142c) acting on the intermediate plate (122) and loading the latter into the inclined position, and in that the positive guidance comprises a rigid link plate (130) arranged tightly on the base (12) which is configured so that the intermediate plate (122) moves to its inclined position during the traversing movement to the extended position of the carriage (14).

6. The belt buckle feeder according to claim 5, wherein the link plate (130) is inclined toward the belt buckle (20) away from the intermediate plate (122) and a carriage-side end (154) of the intermediate plate (122) in the linear traversing direction (V) slides along the link plate (130).

7. The belt buckle feeder according to claim 5, wherein the intermediate plate (22; 122) is arranged on a fixing bolt (28) being tightly connected to the carriage (14) which fixing bolt reaches through an opening (26) in the intermediate plate (22; 122), and wherein the link plate (130) includes two parallel arms (156) which encompass the fixing bolt (28) in the retracted position of the carriage (14).

8. The belt buckle feeder according to claim 5, wherein the link plate (130) is a formed sheet metal part.

9. The belt buckle feeder according to claim 1, wherein the positive guidance comprises a tension element (30) acting on the intermediate plate (22), and wherein at an end portion of the traversing movement of the carriage (14) to the extended position the tension element (30) contacts an engageable element (40) on the base (12) and is held by the latter, with a tensile force ($F_Z$) acting on the tension element (30) being produced.

10. The belt buckle feeder according to claim 9, wherein the tension element (30) is flexible and in particular is a wire or rope.

11. The belt buckle feeder according to claim 9, wherein the tension element (30) acts on the intermediate plate (22) along the tilting direction (N) offset against a center of gravity of the intermediate plate (22) so that a tensile force ($F_Z$) acting on the tension element (30) generates a torque onto the intermediate plate (22).

12. The belt buckle feeder according to claim 11, wherein two securing tabs (36) arranged on opposite longitudinal sides and projecting along the tilting direction (N) are arranged on the intermediate plate (22), with the tension element (30) acting on the securing tabs.

13. The buckle feeder according to claim 1, wherein as the carriage (14) moves in the linear traversing direction (V) to the extended position, the intermediate plate (22; 122) is pivoted a predetermined degree with respect to the linear traversing direction (V) in the tilting direction (N) by the positive guidance, the tilting direction (N) being a direction that is different from the linear traversing direction (V).

14. The buckle feeder according to claim 1, wherein the intermediate plate (22; 122) is directly connected to the belt buckle (20) and the carriage (14).

15. The buckle feeder according to claim 1, wherein the belt buckle (20) is movable with the carriage (14) relative to the base (12) in the linear traversing direction (V).

16. The buckle feeder according to claim 1, wherein as the intermediate plate (22; 122) moves in the linear traversing direction (V), the intermediate plate (22; 122) moves generally parallel to a vehicle occupant, and as the intermediate plate (22; 122) pivots in the tilting direction (N), the intermediate plate (22; 122) pivots toward the vehicle occupant.

17. A belt buckle feeder comprising a stationary base (12) adapted to be fixedly mounted on the vehicle and a carriage (14) movable in a traversing direction (V) to a retracted position and to an extended position vis-à-vis the base (12), the carriage being connected to a belt buckle (20) via an intermediate plate (22; 122) provided between the belt buckle (20) and the carriage (14), the intermediate plate (22; 122) being directly connected to the belt buckle (20) and the carriage (14), as the carriage (14) moves in the traversing direction (V) to the extended position, the intermediate plate (22; 122) is moved in the traversing direction (V) by the carriage (14) and pivoted a predetermined degree with respect to the carriage (14) in a tilting direction (N) by a positive guidance so that in addition to the traversing movement of the carriage (14), the belt buckle (20) reversibly tilts relative to the carriage (14) along the tilting direction (N) from a home position to an inclined position, a spring element (42; 142) exerting a force (F) along the tilting direction (N) on the intermediate plate (22; 122).

* * * * *